(12) United States Patent
Smith

(10) Patent No.: US 7,584,706 B1
(45) Date of Patent: Sep. 8, 2009

(54) GAUGE WHEEL APPARATUS

(76) Inventor: Duane A. Smith, 43937- 183RD St., Hazel, SD (US) 57242

(*) Notice: Subject to any disclaimer, the term of this patent is extended or adjusted under 35 U.S.C. 154(b) by 43 days.

(21) Appl. No.: 11/895,676

(22) Filed: Aug. 27, 2007

(51) Int. Cl.
*A01B 49/04* (2006.01)
*A01C 5/00* (2006.01)
*A01C 13/00* (2006.01)

(52) U.S. Cl. .................. 111/137; 111/164; 111/167; 111/193

(58) Field of Classification Search ........... 301/35.51, 301/35.1, 11.3, 35.621, 64.307, 95.11; 172/76–79; 111/157–169, 190–196, 52, 62, 134–137
See application file for complete search history.

(56) References Cited

U.S. PATENT DOCUMENTS

| | | | |
|---|---|---|---|
| 697,479 A | 4/1902 | Hardcastle | |
| 925,027 A * | 6/1909 | Rice | 301/12.1 |
| 1,099,337 A | 6/1914 | Buchanan | |
| 3,598,069 A | 8/1971 | Hatcher | |
| 4,009,668 A | 3/1977 | Brass et al. | |
| 4,196,679 A | 4/1980 | Moore | |
| 4,986,200 A | 1/1991 | Johnston | |
| 5,197,785 A * | 3/1993 | Berry | 301/63.101 |
| 5,427,038 A | 6/1995 | Ege | |
| 5,970,891 A | 10/1999 | Schlagel | |
| 6,055,925 A | 5/2000 | Horton | |
| 2004/0032161 A1* | 2/2004 | Smyth | 301/9.1 |

FOREIGN PATENT DOCUMENTS

GB 2195587 A * 4/1988

* cited by examiner

*Primary Examiner*—Christopher J. Novosad
(74) *Attorney, Agent, or Firm*—Jeffrey A. Proehl; Woods, Fuller, Shultz & Smith, P.C.

(57) ABSTRACT

A gauge wheel assembly for a farming implement is disclosed which comprises a hub portion positioned substantially centrally with respect to the assembly, a rim portion forming a circumference of the assembly and forming a circumferential ground contacting surface; and an intermediate portion positioned between and connecting the hub portion and the rim portion. The intermediate portion comprises a hub side section positioned about the hub portion, a rim side section positioned inwardly of the rim portion, and a plurality of spoke sections extending from the hub side section to the rim side section and connecting the hub side section to the rim side section. The rim side section encircling the plurality of spoke sections. The hub side section of the intermediate portion defines an aperture with the hub portion being positioned in the hub side section. The intermediate portion is separable from the rim portion and the hub portion.

19 Claims, 5 Drawing Sheets

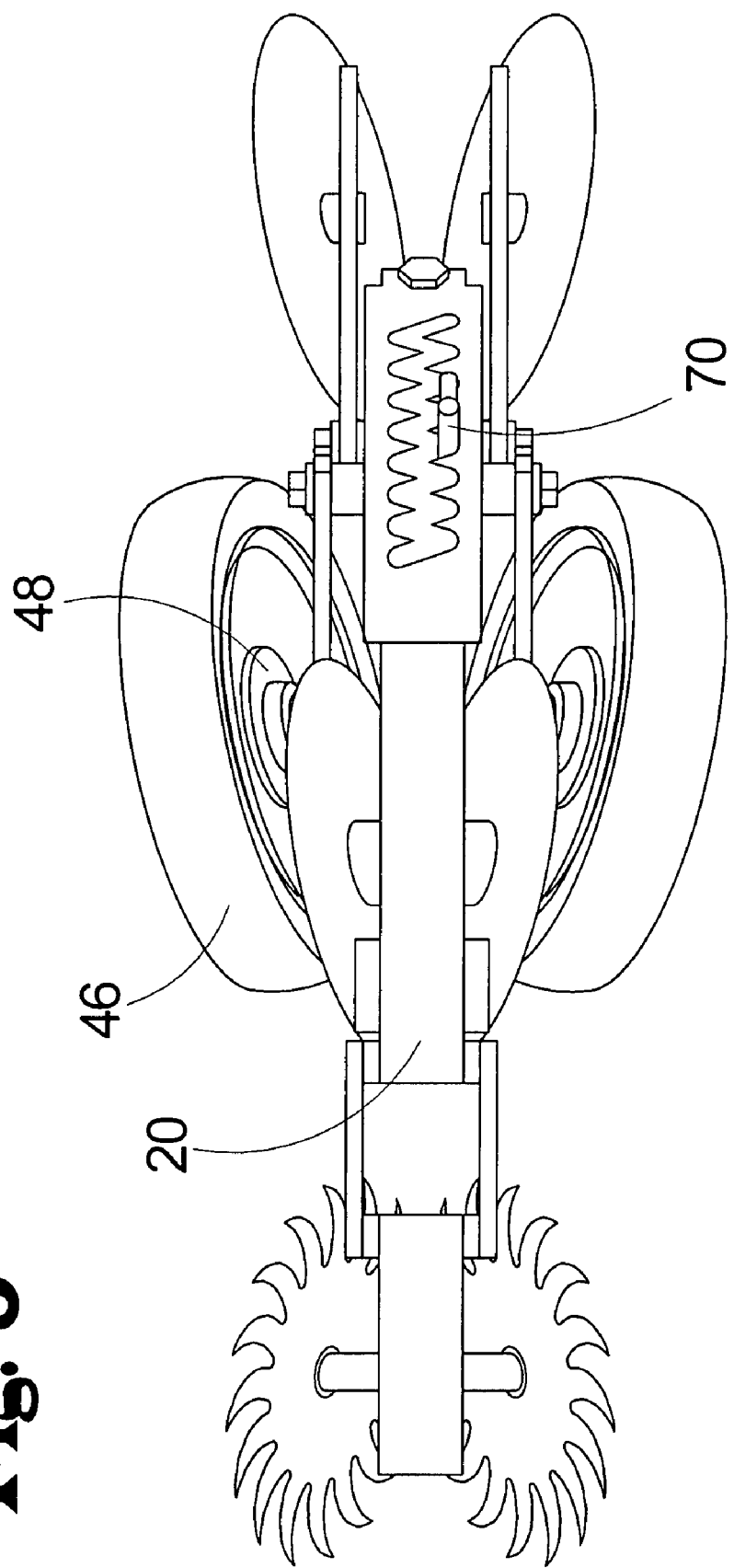

GAUGE WHEEL APPARATUS

BACKGROUND OF THE INVENTION

1. Field of the Invention

The present invention relates to agricultural seed planting equipment and more particularly pertains to a new modular gauge wheel apparatus for controlling the depth of a furrow created by a disc.

2. Description of the Prior Art

Both the methods and technologies employed by individuals engaged in agriculture have advanced throughout the course of society, particularly in the last century. These advances have taken planting technology from an era of broadcasting seeds by hand onto open soil to an era of precise, mechanized seed placement that maximizes the use of available water and nutrients to improve crop emergence and produce high yields.

One of the most significant milestones in agricultural seeding was the invention of the planter, a device that was able to control the frequency and depth at which a seed was deposited beneath the surface of the soil. The consistency at which this depth is maintained is essential to the proper germination and emergence of the seeds. By depositing seeds at a set depth beneath the surface of soil, each seed is subject to similar moisture, temperature and nutrients. In this consistent environment, all seeds of a particular variety germinate, emerge and grow at the same time. By varying this depth, a farmer can choose to place the seeds in the most appropriate growing environment for a particular area of the country and even for a particular field.

In order that agricultural planters place seed at consistent depths, a number of advancements have been developed in the prior art which attempt to solve the problem of seed placement at inconsistent depths.

One such solution to this problem involves incorporating a gauging element into the planting apparatus, wherein the gauging element controls the depth of the planting furrow. In order to properly track the surface of the soil, a wheel is often employed for this purpose. Typical gauge wheels employ a wheel element that is connected to a furrowing disc in such a manner that the vertical forces imparted on the gauge wheel are transferred to the furrowing disc. In this manner, when the gauge wheel encounters a variation in the elevation of soil proximate to the furrowing disc, the gauge wheel travels over the variation, causing the vertical position of the furrowing disc to move accordingly. The depth of the furrow then remains substantially the same in areas of high elevation as in areas of low elevation in relation to the surface of the soil.

Gauge wheel embodiments that comprise the prior art typically include a rim with a solid center section, and usually a tire mounted on the rim. Furthermore, the wheels are often positioned adjacent to a furrowing disc, which can result in dirt and debris building up between the gauge wheel and disc. To minimize this occurrence, a scraping element may be interposed between the gauge wheel and the furrowing disc for removing residual dirt that remains on surface of the furrowing disc as the disc rotates out of a freshly cut furrow.

However, in situations where the buildup of residual dirt is significant, the quantity of dirt and debris can overwhelm the ability of the scraping element to remove them, and the dirt and debris can build up between the furrowing disc and gauge wheel, causing lateral pressure on the discs that can prevent the discs from turning, thereby requiring the equipment operator to manually remove the debris. Residual dirt can buildup on the furrowing disc for many reasons, including in situations where there is high moisture content in the soil and where farming practices such as to-till farming are employed. No-till farming is a practice by which a quantity of crop debris from past growing seasons is left in the field for the current growing season. Because of the positioning and construction of the gauge wheel, it can impede the removal of this dirt and debris, and freeing the debris frequently requires removal of the gauge wheel from the planting apparatus.

In muddy field conditions, the problem of mud collecting between the gauge wheel and the furrowing disc causes lateral pressure just as does residual dirt and debris. Because mud build-up is a perpetual problem when planting in muddy conditions, substantial and frequent intervention is necessary by the equipment operator to free the mud from the space between the gauge wheel and furrowing disc and keep that space free of mud. After the gauge wheel is removed, mud is cleared from the space and the gauge wheel is replaced, the solid center section structure of the gauge wheel continues to encourage a build-up of mud so long as the planting apparatus is being used in muddy conditions.

Some gauge wheel designs have been directed toward planting seeds in soils with higher levels of moisture than normally permissible. To this end, some of these designs have employed a unitary structure with spaced fingers located about the perimeter of the gauge wheel. The fingers are intended to limit compacting of the wet soil. In muddy conditions however, these fingers may encourage a build-up of mud around the fingers and in the spaces therebetween. In very wet soil, the small surface area of the fingers limits their buoyancy in the soil, and thus the ability of the fingers to remain on top of the surface of the soil. In no-till fields, these fingers appear likely to collect and retain crop debris therebetween in a manner that exacerbates the previously mentioned problem of dirt and debris causing movement of the furrowing disc to freeze.

In these respects, the gauge wheel according to the present invention substantially departs from the conventional concepts and designs of the prior art, and in so doing provides a modular gauge wheel apparatus primarily developed for the purpose of controlling the depth of a furrow created by a disc.

SUMMARY OF THE INVENTION

In view of the foregoing disadvantages inherent in the known types of agricultural seed planting equipment now present in the prior art, the present invention provides a new gauge wheel construction wherein the same can be utilized for controlling the depth of a furrow created by a disc.

To attain this, the present invention generally comprises a gauge wheel assembly for a farming implement is disclosed which comprises a hub portion positioned substantially centrally with respect to the assembly, a rim portion forming a circumference of the assembly and forming a circumferential ground contacting surface; and an intermediate portion positioned between and connecting the hub portion and the rim portion. The intermediate portion comprises a hub side section positioned about the hub portion, a rim side section positioned inwardly of the rim portion, and a plurality of spoke sections extending from the hub side section to the rim side section and connecting the hub side section to the rim side section. The rim side section encircling the plurality of spoke sections. The hub side section of the intermediate portion defines an aperture with the hub portion being positioned in the hub side section. The intermediate portion is separable from the rim portion and the hub portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 5 is a schematic exploded component view of the present invention.

DESCRIPTION OF PREFERRED EMBODIMENTS

Figure 1:
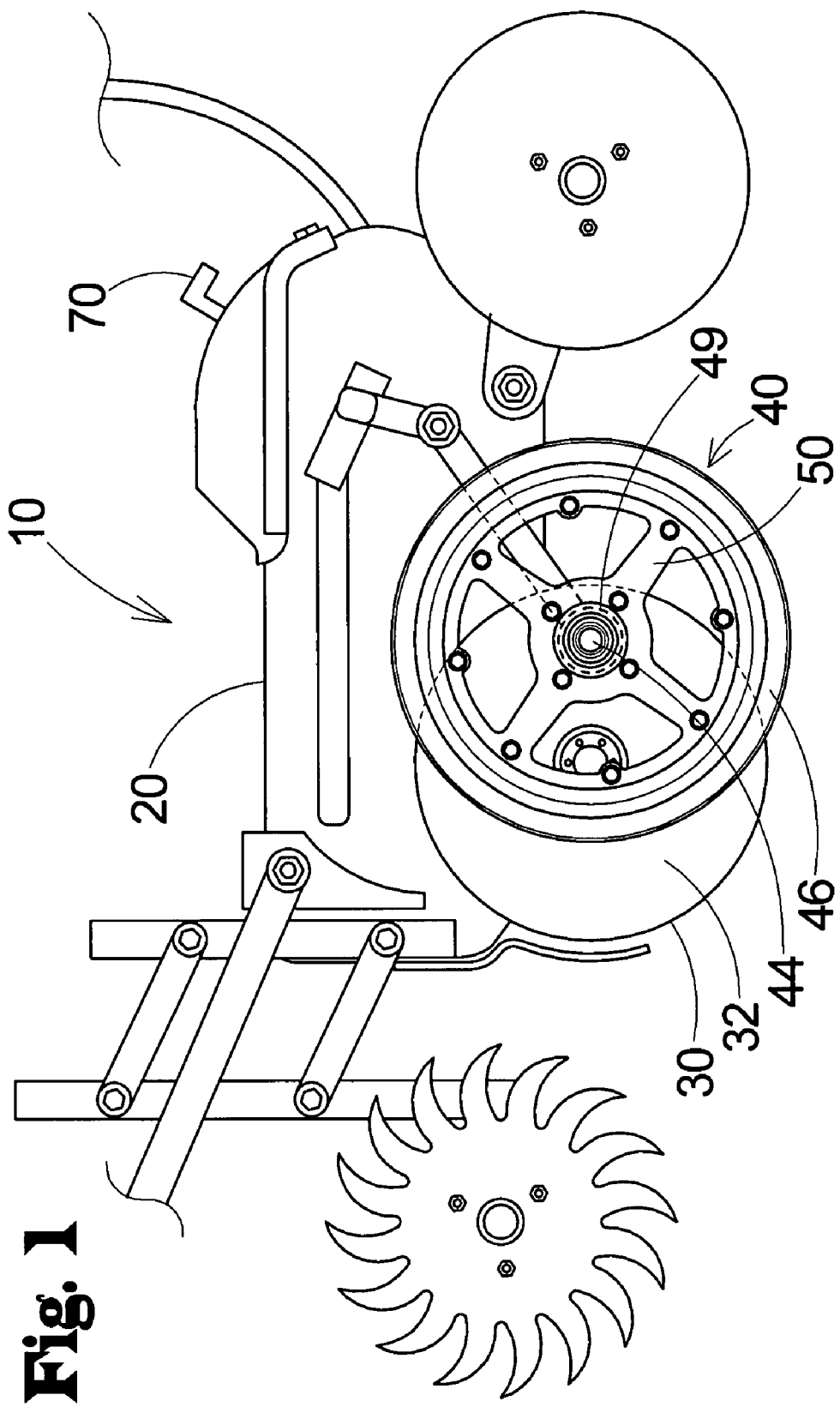
FIG. 1 is a schematic perspective view of a new gauge wheel according to the present invention.

With reference now to the drawings, and in particular to FIGS. 1 through 6 thereof, a new gauge wheel embodying the principles and concepts of the present invention and generally designated by the reference numeral 10 will be described.

Figure 2:
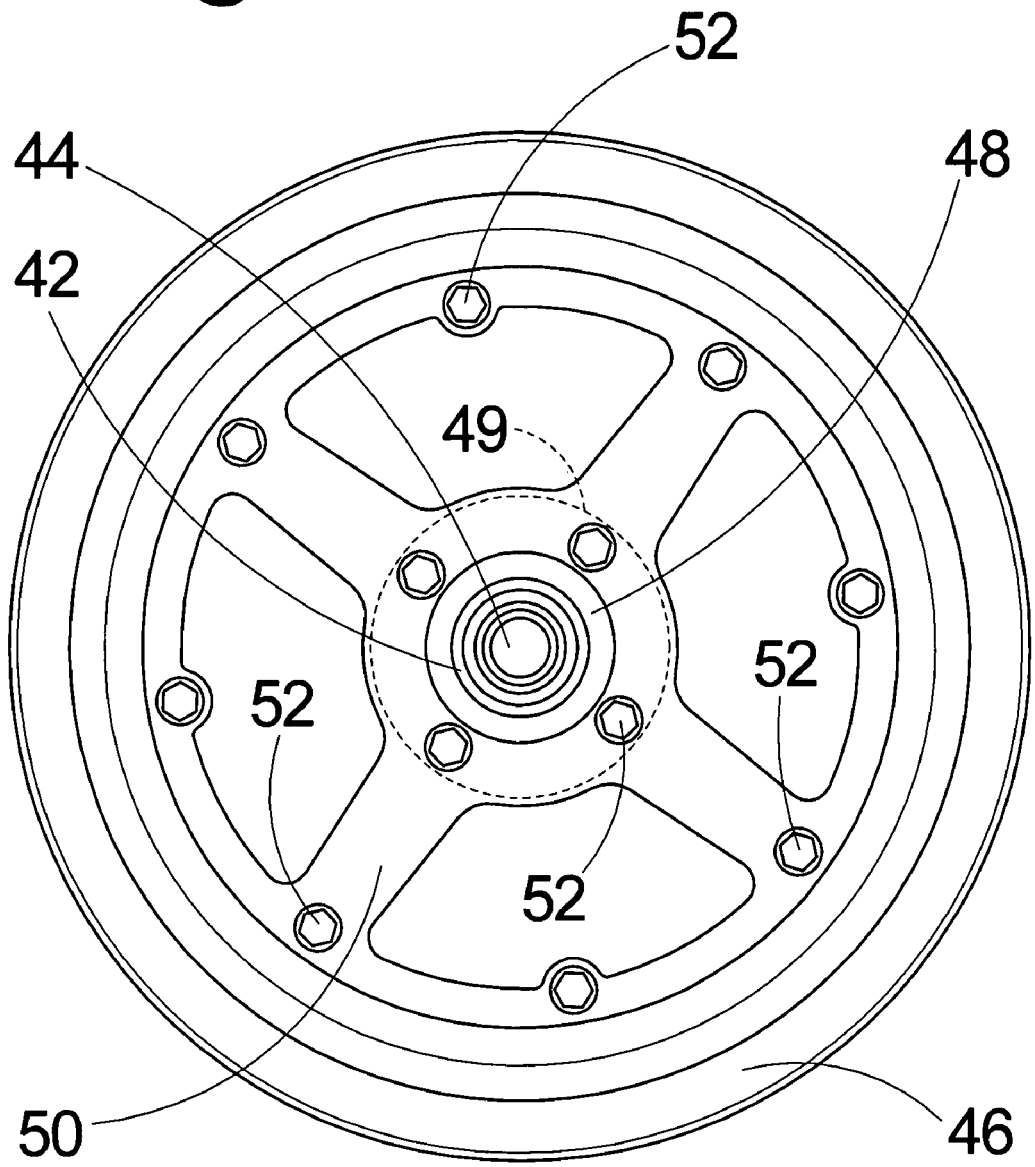
FIG. 2 is a schematic side elevation view of the gauge wheel portion of the present invention.

As best illustrated in FIGS. 1, 2, and 5, the disclosure relates to a gauge wheel system 10 for a farming implement for controlling the depth of a furrow created by a disc. The system may include a gauge wheel assembly 40 in combination with a farming implement including a frame 20, a disc 30 mounted on the frame 20 in a manner permitting the disc 30 to rotate with respect to the frame 20, and a means 70 for adjusting a position of the gauge wheel 40 with respect to the disc 30.

The gauge wheel 40 may be positioned so that a portion of the circumference of the wheel contacts a portion of the surface 32 of the disc 30. A benefit of this interface between the gauge wheel 40 and the disc 30 is that the gauge wheel 40 acts to scrape mud and dirt from the disc 30 as the disc creates a furrow in the soil. The gauge wheel assembly 40 may be mounted to the frame 20 so it is free to rotate with respect to the frame 20. In the illustrative embodiment, the gauge wheel assembly 40 rotates about a bearing 42 or other rotating element located at the center of the wheel. Generally, the gauge wheel assembly 40 may rotate about an axis oriented substantially parallel to an axis about which the disc 30 is rotatable. There may also be embodiments in which the lateral position of the gauge wheel assembly is not perpendicular to the axis about which it rotates in cases where a bearing 42 or rotating element with lateral play is used to facilitate rotation of the gauge wheel 40.

Figure 3:
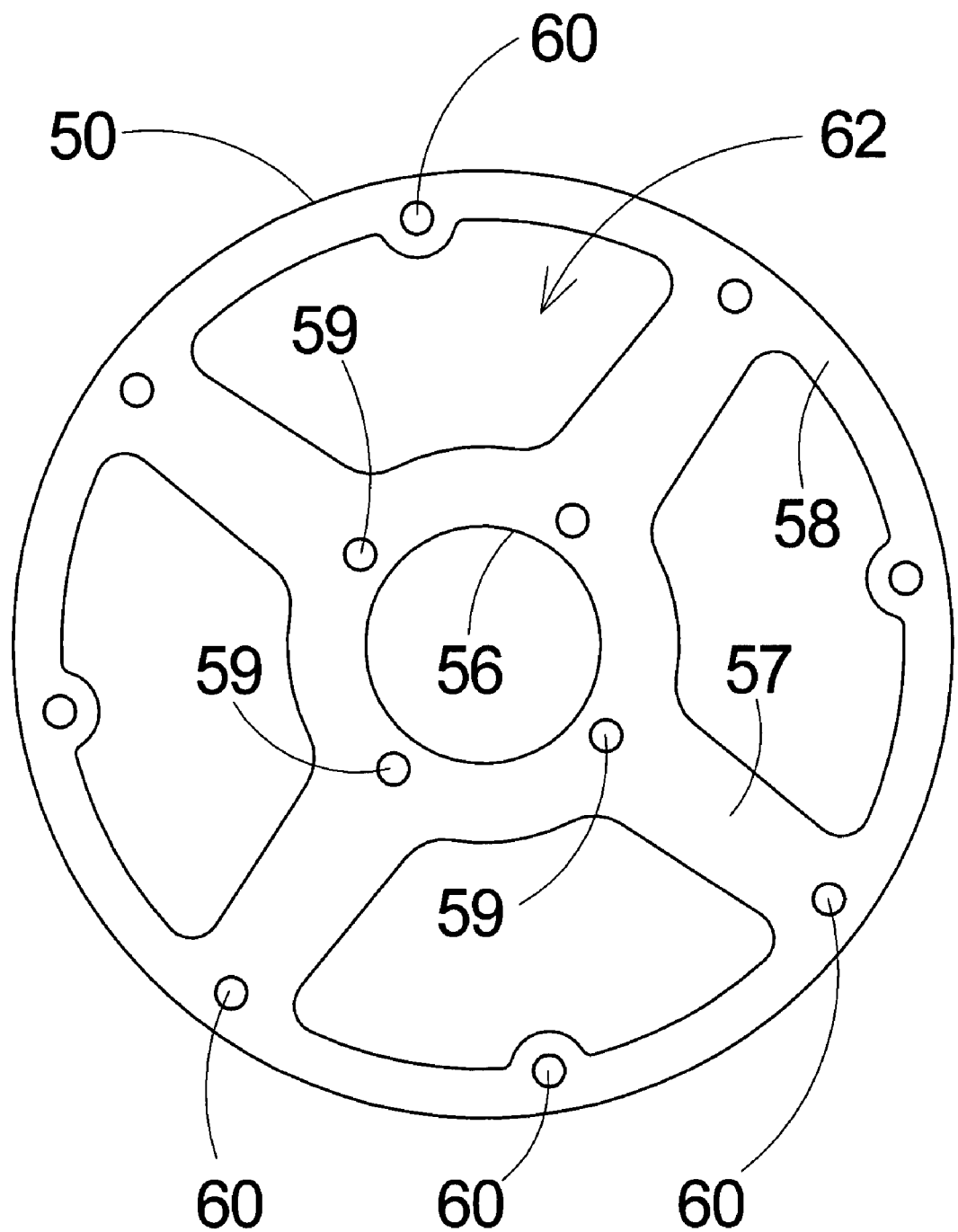
FIG. 3 is a schematic side elevation view of the intermediate portion of the present invention.
Figure 4:
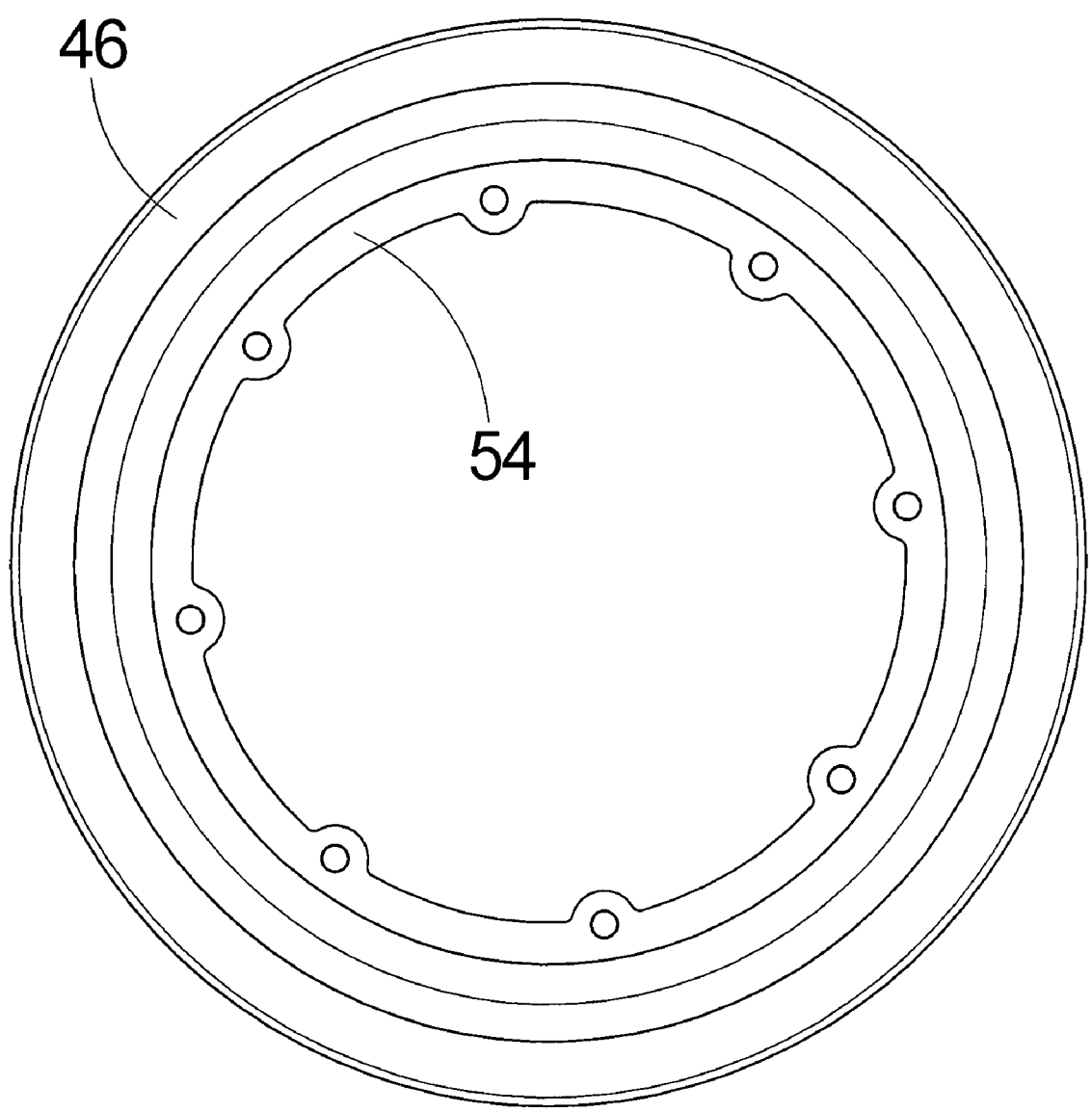
FIG. 4 is a schematic side elevation view of the rim portion of the present invention.

As best illustrated in FIGS. 2, 3, and 4, the gauge wheel 40 comprises a gauge wheel assembly 40 and an axle 44 mounted on the frame. The gauge wheel assembly 40 may be generally circular in shape, and may have a rim with a uniform width. The gauge wheel assembly 40 may include a rim portion 46, a hub portion 48, and an intermediate portion 50 positioned between the hub portion 48 and the rim portion 46. The assembly 40 may also include a plurality of fasteners 52 fastening the intermediate portion 50 to the hub portion 48, and fastening the rim portion 46 to the intermediate portion 50.

The rim portion 46 may comprise a rim structure with a substantially continuous circumferential surface that extends along the circumference of the gauge wheel assembly 40. In various embodiments, the rim portion 46 has a rim structure for retaining a tire-like component, such as one made of rubber or a similar material. A radial flange 54 may extend radially inwardly along the rim portion 46. The rim portion 46 may have a first side edge that is substantially continuous and substantially circular, and may be located in a plane substantially parallel to the plane of the circumferential surface of the rim portion 46. The rim portion 46 may also have a second edge positioned at an opposite side of the rim portion from the first edge, such that the second edge is also substantially continuous and substantially circular, and also may be located in a plane substantially parallel to the plane of the circumferential surface of the rim portion 46. The radial flange 54 may include apertures for receiving one or more fasteners 52, such as a bolt, machine screw, rivet or other similar fastening means. In some embodiments, the radial flange 54 may be joined to the intermediate portion in a more permanent fashion, such as by joining two materials such as coalescence, soldering or brazing.

The rim portion 46 may define a ground-contacting surface that is substantially circular in a plane perpendicular to the axis of rotation of the gauge wheel 40. The rim portion 46 has a substantially uniform width along the entire circumference, and has a convex profile in the plane extended through the axis of rotation.

The hub portion 48 may comprise a hub structure, and may be positioned centrally with respect to the rim portion 46. The hub portion 48 may define a passage for receiving an axle 44. In some embodiments, the hub portion 48 includes a bearing or other rotating element for facilitating rotation of the hub portion 48 with respect to the axle 44 engaged by the rotating element. The hub portion 48 may include an outwardly extending flange 49 for interfacing the component with other structures. The flange 49 may include apertures for receiving a fastener 52. In other embodiments, the flange 49 may have a more permanent fastening to nearby components without using a fastener that passes through the flange.

The intermediate portion 50 may comprise an intermediate structure that includes a hub side section 56, a plurality of spoke sections 57, and a rim side section 58. The hub side section 56 may be positioned about the hub portion 48 so that the hub portion 48 is positioned in an aperture defined by the hub side section 56. In the illustrative embodiment, a plurality of hub mounting apertures 59 may be located in the hub side section 56, and arranged in a circle about the hub portion 48, for receiving fasteners 52 to fasten the hub portion 48 to the hub side section 56. In some embodiments, the hub side section 56 may have a more permanent fastening to the hub portion 48 without using a fastener that passes through the hub side section 56 or the hub portion 48.

The plurality of spoke sections 57 may be coupled to and radiating outwardly from the hub side section 56. Each spoke section 57 has an inner first end and an outer second end. The first end of each spoke section 57 may connect to the hub side element 56, and the second end of each spoke section 57 may connect to the rim side section 58. The rim side section 58 may be positioned inwardly of the rim portion 46, and be coupled to the outer ends of a plurality of spoke sections 57. The rim side section 58 thus may encircle the spoke sections 57. In the illustrative embodiment, the rim side section 58 includes a plurality of rim mounting apertures 60 for receiving fasteners 52 to fasten the rim side section 58 to the rim portion 46. The intermediate portion 50 thus may be separable from the rim portion 46 and the hub structure 48.

The means 70 for adjusting a position of the gauge wheel 40 with respect to the disc 30 typically adjusts a distance between the axis of the rotation of the gauge wheel 40 and the axis of rotation of the disc 30. Structures of performing such a function are known to those skilled in the art, and are described, for example, in U.S. Pat. No. 5,235,922 to Deckler, which is incorporated herein by reference in its entirety.

In use, the gauge wheel system 10 is lowered to the ground so that the disc 30 penetrates the surface of the ground to a depth where the rim portion 46 of the gauge wheel 40 contacts the surface of the ground. Because the gauge wheel 40 and disc 30 are linked together, the depth of the disc 30 is controlled by the position of the gauge wheel 40 in respect to the disc 30. This position can be adjusted with an adjustment means 70, by adjusting the distance between the axis of rotation of both the gauge wheel 40 and the disc 30.

Once the gauge wheel apparatus 10 is lowered into the ground, a horizontal force is imparted on the apparatus to move it in a forward direction, causing the both the disc 30 and gauge wheel 40 to rotate, as the disc 30 cuts a furrow in the soil. As the gauge wheel apparatus 10 is moved and the disc 30 cuts a furrow in the soil, particles of dirt may adhere to the surface 32 of the disc 30. When the section of the disc 30 with these particles becomes oriented so that it is in contact with the gauge wheel 40, the particles are scraped from the disc 30 by the circumferential surface of the gauge wheel 40. In some instances, the gauge wheel 40 may fail to completely scrape these particles free of the disc 30. Any such particles that may pass beyond the point of contact between the gauge wheel 40 and the disc 30 and into the space between the surface 32 of the disc 30 and the gauge wheel 40 are generally free to move or escape from this space through the openings 62 between the spoke sections 57 that comprise a portion of the intermediate portion 50 of the wheel assembly. Likewise, any dirt or debris that becomes lodged between the surface 32 of the disc 30 and the gauge wheel 40 can move or escape through these openings 62, or be manually removed through the openings 62 by an equipment operator.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gauge wheel assembly for a farming implement to set a depth of penetration of a tool into a ground surface, the gauge wheel assembly comprising:
   a hub portion positioned substantially centrally with respect to the gauge wheel assembly about an axis of rotation for the gauge wheel assembly,
   a rim portion forming a circumference of the gauge wheel assembly and forming a circumferential ground contacting surface;
   an intermediate portion positioned between the hub portion and the rim portion and connecting the rim portion to the hub portion, the intermediate portion comprising:
      a hub side section positioned about the hub portion;
      a rim side section positioned inwardly of the rim portion; and
      a plurality of spoke sections extending from the hub side section to the rim side section and connecting the hub side section to the rim side section, the rim side section encircling the plurality of spoke sections;
   wherein the hub side section of the intermediate portion defines an aperture, the hub portion being positioned in the aperture of the hub side section; and
   wherein the intermediate portion is separable from the rim portion and the intermediate portion is separable from the hub portion;
   wherein the circumferential ground contacting surface extends along an entirety of an outermost circumference of the rim portion such that the ground contacting surface contacts the ground surface;
   wherein the ground contacting surface has a uniform width along the entirety of the circumference of the rim portion.

2. The assembly of claim 1 wherein the hub side section, the plurality of spoke sections, and the rim side section of the intermediate portion are formed of a single piece of material.

3. The assembly of claim 1 wherein the ground contacting surface at the outermost circumference is circular in a plane perpendicular to the axis of rotation of the wheel assembly.

4. The assembly of claim 1 wherein the ground contacting surface has a convex arcuate profile shape in a plane in which the axis of rotation of the wheel assembly lies.

5. The assembly of claim 1 wherein the rim portion has a first side edge and a second side edge, the first side edge and the second side edge being positioned at opposite sides of the rim portion, the first side edge being substantially continuous and substantially circular and the second side edge being substantially continuous and substantially circular.

6. The assembly of claim 1 further comprising a plurality of fasteners for fastening the intermediate portion to the hub portion and the rim portion to the intermediate portion.

7. The assembly of claim 1 wherein the rim portion has a substantially continuous circular circumferential surface extending along the circumference of the gauge wheel assembly.

8. The assembly of claim 1 wherein the hub side section, the plurality of spoke sections, and the rim side section of the intermediate portion are formed of a single piece of material;
   wherein the ground contacting surface at the outermost circumference is circular in a plane perpendicular to the axis of rotation of the wheel assembly;
   wherein the ground contacting surface has a convex arcuate profile shape in a plane in which the axis of rotation of the wheel assembly lies;
   wherein the rim portion has a first side edge and a second side edge, the first side edge and the second side edge being positioned at opposite sides of the rim portion, the first side edge being substantially continuous and substantially circular and the second side edge being substantially continuous and substantially circular;
   wherein the rim portion has a substantially continuous circumferential surface extending along the circumference of the gauge wheel assembly; and
   a plurality of fasteners for fastening the intermediate portion to the hub portion and the rim portion to the intermediate portion.

9. A gauge wheel system for a farming implement, comprising:
   a frame;
   a disc mounted on the frame to create a furrow in a ground surface, the disc having a substantially circular side surface;
   a gauge wheel assembly mounted on the frame in a position laterally adjacent to the side surface of the disc and effective to set a depth of penetration of the disc in the ground surface, the gauge wheel assembly comprising:
      a hub portion positioned substantially centrally with respect to the gauge wheel assembly,
      a rim portion forming a circumference of the gauge wheel assembly and forming a circumferential ground contacting surface;
      an intermediate portion positioned between the hub portion and the rim portion and connecting the rim portion to the hub portion, the intermediate portion comprising:
         a hub side section positioned about the hub portion;
         a rim side section positioned inwardly of the rim portion; and
         a plurality of spoke sections extending from the hub side section to the rim side section and connecting the hub side section to the rim side section, the rim side section encircling the plurality of spoke sections;
         wherein the hub side section of the intermediate portion defines an aperture, the hub portion being positioned in the aperture of the hub side section; and
      wherein the plurality of spoke sections of the intermediate portion define a plurality of openings through the intermediate portion such that soil accumulating on the side surface of the disc is able to pass through the openings of the intermediate portion;
   wherein the circumferential ground contacting surface extends along an entirety of an outermost circumference of the rim portion such that the ground contacting surface contacts the ground surface;
   wherein the ground contacting surface has a uniform width along the entirety of the circumference of the rim portion.

10. The system of claim 9 wherein the hub side section, the plurality of spoke sections, and the rim side section of the intermediate portion are formed of a single piece of material.

11. The system of claim 9 wherein the ground contacting surface at the outermost circumference is circular in a plane perpendicular to the axis of rotation of the wheel assembly.

12. The system of claim 9 wherein the ground contacting surface has a convex arcuate profile shape in a plane in which the axis of rotation of the wheel assembly lies.

13. The system of claim 9 wherein the rim portion has a first side edge and a second side edge, the first side edge and the second side edge being positioned at opposite sides of the rim portion, the first side edge being substantially continuous and substantially circular and the second side edge being substantially continuous and substantially circular.

14. The system of claim 9 further comprising a plurality of fasteners for fastening the intermediate portion to the hub portion and the rim portion to the intermediate portion.

15. The system of claim 9 wherein the rim portion has a substantially continuous circular circumferential surface extending along the circumference of the gauge wheel system.

16. The system of claim 9 wherein the hub side section, the plurality of spoke sections, and the rim side section of the intermediate portion are formed of a single piece of material;
   wherein the ground contacting surface at the outermost circumference is circular in a plane perpendicular to the axis of rotation of the wheel assembly;
   wherein the ground contacting surface has a convex arcuate profile shape in a plane in which the axis of rotation of the wheel assembly lies;
   wherein the rim portion has a first side edge and a second side edge, the first side edge and the second side edge being positioned at opposite sides of the rim portion, the first side edge being substantially continuous and substantially circular and the second side edge being substantially continuous and substantially circular;
   wherein the rim portion has a substantially continuous circumferential surface extending along the circumference of the gauge wheel system;
   a plurality of fasteners for fastening the intermediate portion to the hub portion and the rim portion to the intermediate portion; and
   wherein the gauge wheel assembly includes mounting structure mounting the hub portion of the gauge wheel assembly to the frame, the mounting structure being adjustable to adjust a vertical position of the hub portion with respect to the disc to control a depth of penetration of the disc into the ground surface.

17. The system of claim 9 wherein the gauge wheel assembly includes mounting structure mounting the hub portion of the gauge wheel assembly to the frame, the mounting structure being adjustable to adjust a vertical position of the hub portion with respect to the disc to control a depth of penetration of the disc into the ground surface.

18. A gauge wheel system for a farming implement, comprising:
   a frame;
   a disc mounted on the frame, the disc having a surface on a side of the disc;
   a gauge wheel assembly mounted on the frame and positioned adjacent to the disc and being mounted so as to be effective to set a depth of penetration of the disc in the ground surface, the gauge wheel assembly comprising:
      a hub portion positioned substantially centrally with respect to the gauge wheel assembly,
      a rim portion forming a circumference of the gauge wheel assembly and forming a circumferential ground contacting surface;

an intermediate portion positioned between the hub portion and the rim portion and connecting the rim portion to the hub portion, the intermediate portion comprising:
- a hub side section positioned about the hub portion;
- a rim side section positioned inwardly of the rim portion; and
- a plurality of spoke sections extending from the hub side section to the rim side section and connecting the hub side section to the rim side section, the rim side section encircling the plurality of spoke sections; and
- wherein the hub side section of the intermediate portion defines an aperture, the hub portion being positioned in the aperture of the hub side section;

wherein a portion of rim portion of the gauge wheel assembly contacts a portion of the surface of the disc to scrape soil from the side surface of the disk; and wherein the plurality of spoke sections of the intermediate portion define a plurality of openings through the intermediate portion of the gauge wheel assembly such that soil accumulating on the side surface of the disc is able to pass through the openings of the intermediate portion.

19. The system of claim 18 wherein the ground contacting surface at the outermost circumference is circular in a plane perpendicular to the axis of rotation of the wheel assembly; and wherein the ground contacting surface has a convex arcuate profile shape in a plane in which the axis of rotation of the wheel assembly lies.

* * * * *